United States Patent
Douglas et al.

(10) Patent No.: US 6,384,913 B1
(45) Date of Patent: May 7, 2002

(54) ACTIVE COMPENSATOR DAMPING IN LASER TRANSMITTERS

(75) Inventors: Frank Beard Douglas, Tipp City; James Nelson Hayes, Urbana, both of OH (US)

(73) Assignee: Spectra Precision, Inc., Dayton, OH (US)

( * ) Notice: Subject to any disclaimer, the term of this patent is extended or adjusted under 35 U.S.C. 154(b) by 0 days.

(21) Appl. No.: 09/364,949

(22) Filed: Jul. 30, 1999

(51) Int. Cl.$^7$ ............................ G01B 11/26; G01C 21/02
(52) U.S. Cl. ...................... 356/248; 356/249; 250/548; 250/559.3; 250/206.1
(58) Field of Search ................... 356/73, 248, 250, 356/249; 250/548, 559.3, 559.29, 206, 206.1, 206.2

(56) References Cited

U.S. PATENT DOCUMENTS

| | | |
|---|---|---|
| 4,221,483 A | 9/1980 | Rando |
| 4,801,791 A | 1/1989 | Cain |
| 4,852,265 A | 8/1989 | Rando et al. |
| 4,912,851 A | 4/1990 | Rando et al. |
| 5,026,157 A | 6/1991 | Winckler |
| 5,033,848 A | 7/1991 | Hart et al. |
| 5,075,977 A | 12/1991 | Rando |
| 5,182,863 A | 2/1993 | Rando |
| 5,287,627 A | 2/1994 | Rando |
| 5,459,932 A | 10/1995 | Rando et al. |
| 5,524,352 A | 6/1996 | Rando et al. |
| 5,541,727 A | 7/1996 | Rando et al. |
| 5,619,802 A | 4/1997 | Rando et al. |
| 5,844,679 A | * 12/1998 | Detweiler et al. .......... 356/248 |
| 5,994,688 A | * 11/1999 | Jackson et al. .......... 250/206.2 |
| 6,088,623 A | * 7/2000 | Yowler et al. ................. 700/56 |
| 6,121,598 A | * 9/2000 | Green et al. ............. 250/206.1 |

* cited by examiner

Primary Examiner—Frank G. Font
Assistant Examiner—Layla Lauchman
(74) Attorney, Agent, or Firm—Killworth, Gottman, Hagan & Schaeff LLP

(57) ABSTRACT

A laser transmitter is provided including a specialized compensator assembly damping mechanism. In accordance with one embodiment of the present invention, a compensator assembly position detector is arranged to detect a position $X_1$ of the compensator assembly with respect to the X-axis, and a position $Y_1$ of the compensator assembly with respect to the Y-axis. The compensator assembly damping mechanism includes an X-axis magnetic damping mechanism, a Y-axis magnetic damping mechanism, and a rotational damping mechanism. The active feedback circuit is arranged to (i) drive the X-axis magnetic damping mechanism so as to increase a damping force generated by the X-axis magnetic damping mechanism as a rate of change of the signal indicative of the position $x_1$ increases, and (ii) drive the Y-axis magnetic damping mechanism so as to increase a damping force generated by the Y-axis magnetic damping mechanism as a rate of change of the signal indicative of the position $y_1$ increases.

19 Claims, 12 Drawing Sheets

ACTIVE COMPENSATOR DAMPING IN LASER TRANSMITTERS

CROSS REFERENCE TO RELATED APPLICATIONS

The present invention is related in part to portions of the invention described in co-pending U.S. patent application Ser. No. 08/834,472, POSITION LEVELING SENSOR FOR A LASER TRANSMITTER, filed Apr. 11, 1997.

BACKGROUND OF THE INVENTION

The present invention relates to laser transmitters and, more particularly, to laser transmitters that employ an optical compensator assembly to correct for out-of-plumb alignment of the transmitter.

Reference laser beams are generated by a conventional laser transmitters for use in surveying and construction. Most commonly, the reference laser beam is swept back and forth in, or rotated through, a horizontal plane. The reference laser beam is most effective if it is maintained in a precisely horizontal orientation. Typically, this requires that the frame of the transmitter itself be maintained in a precisely vertical or horizontal orientation. Many conventional laser transmitters include optical elements that are arranged to maintain a precise horizontal reference beam by automatically compensating for small out-of-plumb tilting of the transmitter frame.

One common optical compensator is illustrated in U.S. Pat. No. 4,221,483. The optical assembly disclosed therein comprises a positive lens suspended beneath a solid state light source by a light-weight mechanical suspension. The suspension includes a plurality of fine wires which suspend the positive lens so as to permit the lens to shift to a truly vertical position, relative to the light source, under the influence of gravity. The shift to vertical compensates for overall tilt of the transmitter housing. According to a specific aspect of the invention described in the '483 patent, undesired oscillation or vibration of the lens is reduced by an air or magnetic damping system.

Conventional damping arrangements have achieved limited success, however, and there exists a continuing need for a damping scheme that is more versatile and workable than the variety of conventional damping schemes and that achieves improved damping of vibrations and oscillations in laser transmitters.

BRIEF SUMMARY OF THE INVENTION

This need is met by the present invention wherein a laser transmitter is provided including a specialized compensator assembly damping mechanism. In accordance with one embodiment of the present invention, a laser transmitter is provided comprising a housing, a laser light source, an optical projecting device, a compensator assembly, a compensator assembly suspension, a compensator assembly position detector, a compensator assembly damping mechanism, and an active feedback circuit. The laser light source is coupled to the housing and is operative to generate a beam of laser light. The optical projecting device is positioned to direct the beam of laser light to define a reference beam of light projected out of the housing. The compensator assembly is arranged to provide an optical correction for mis-alignment of the housing relative to a vertical axis. The compensator assembly suspension is arranged to couple the compensator assembly to the housing and defines three degrees of freedom in which the compensator assembly is free to move. The three degrees of freedom include movement along an X-axis orthogonal to the vertical axis, movement along a Y-axis orthogonal to the X-axis and the vertical axis, and rotation through an angle $\theta$ in a plane parallel to the X and Y axes. The compensator assembly position detector is arranged to detect a position $X_1$ of the compensator assembly with respect to the X-axis, and a position $Y_1$ of the compensator assembly with respect to the Y-axis.

The compensator assembly damping mechanism includes an X-axis magnetic damping mechanism, a Y-axis magnetic damping mechanism, and a rotational damping mechanism. The rotational damping mechanism is arranged to magnetically damp movement of the compensator assembly through the angle $\theta$. The active feedback circuit is arranged to (i) drive the X-axis magnetic damping mechanism so as to increase a damping force generated by the X-axis magnetic damping mechanism as a rate of change of the signal indicative of the position $X_1$, increases, and (ii) drive the Y-axis magnetic damping mechanism so as to increase a damping force generated by the Y-axis magnetic damping mechanism as a rate of change of the signal indicative of the position $Y_1$ increases. The active feedback circuit may additionally be arranged to drive the X-axis magnetic damping mechanism as a function of a time derivative of a signal indicative of the position $X_1$, and drive the Y-axis magnetic damping mechanism as a function of a time derivative of a signal indicative of the position $Y_1$.

The X-axis and Y-axis magnetic damping mechanisms preferably include first and second permanent magnets mechanically coupled to the compensator assembly and first and second coil assemblies positioned proximate the first and second permanent magnets and mechanically coupled to the housing.

The X-axis magnetic damping mechanism is typically displaced from the X-axis by a first displacement angle $\beta_x$ along an arc about a central vertical axis of the compensator assembly and the Y-axis magnetic damping mechanism is typically displaced from the Y-axis by a second displacement angle $\beta_y$ along an arc about the central vertical axis. Accordingly, the active feedback circuit is preferably arranged to compensate for the first displacement angle $\beta_x$ and the second displacement angle $\beta_y$ by executing respective weighted sums of the signals indicative of the position $X_1$ and the position $Y_1$.

The rotational damping mechanism preferably comprises an eddy current damping mechanism including a conductor mechanically coupled to and projecting from the compensator assembly and a magnetic field source mechanically coupled to the housing. The magnetic field source and the conductor are arranged such that the conductor intersects a magnetic field generated by the magnetic field source and is oriented substantially perpendicular to the magnetic field. The conductor preferably comprises a pair of substantially parallel fins, the magnetic field source preferably defines a pair of field zones, and the magnetic field source and the conductor are preferably arranged such that each of the fins intersects one of the pair of field zones.

The beam of laser light generated by the laser light source preferably comprises a primary beam of laser light generated along a first axis. Further, the compensator assembly position detector preferably comprises a position detector light source operative to generate a secondary beam of light along a second axis offset from the first axis and a photodetector. The position detector light source is independent of the laser light source and the compensator assembly position detector is arranged to detect the position $X_1$ and the position $Y_1$ as a function of a position of the secondary beam of light on the photodetector.

In accordance with another embodiment of the present invention, a laser transmitter is provided comprising a housing, a laser light source, an optical projecting device, a compensator assembly, a compensator assembly suspension, a compensator assembly position detector, a compensator assembly damping mechanism, and an active feedback circuit. The compensator assembly damping mechanism includes an X-axis magnetic damping mechanism and a Y-axis magnetic damping mechanism. The X-axis magnetic damping mechanism includes a first permanent magnet mechanically coupled to the compensator assembly, and a first coil assembly positioned proximate the first permanent magnet and mechanically coupled to the housing. The Y-axis magnetic damping mechanism includes a second permanent magnet mechanically coupled to the compensator assembly, and a second coil assembly positioned proximate the second permanent magnet and mechanically coupled to the housing. The active feedback circuit is arranged to (i) drive the X-axis magnetic damping mechanism so as to increase a damping force generated by the X-axis magnetic damping mechanism as a rate of change of the signal indicative of the position $X_1$ increases and (ii) drive the Y-axis magnetic damping mechanism so as to increase a damping force generated by the Y-axis magnetic damping mechanism as a rate of change of the signal indicative of the position $Y_1$ increases.

In accordance with yet another embodiment of the present invention, a laser transmitter is provided comprising a housing, a laser light source, an optical projecting device, a compensator assembly, a compensator assembly suspension, a compensator assembly position detector, a compensator assembly damping mechanism, and an active feedback circuit. The compensator assembly position detector comprises a photodetector and a position detector light source operative to generate a secondary beam of light along a second axis offset from the first axis. The position detector light source is independent of the primary laser light source and the compensator assembly position detector is arranged to detect a position $X_1$ of the compensator assembly with respect to the X-axis and a position $Y_1$ of the compensator assembly with respect to the Y-axis as a function of a position of the secondary beam of light on the photodetector.

Accordingly, it is an object of the present invention to provide an improved laser transmitter that incorporates a damping scheme that is more versatile and workable than the variety of conventional damping schemes and that achieves improved damping of vibrations and oscillations in laser transmitters. Other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

Figure 1:
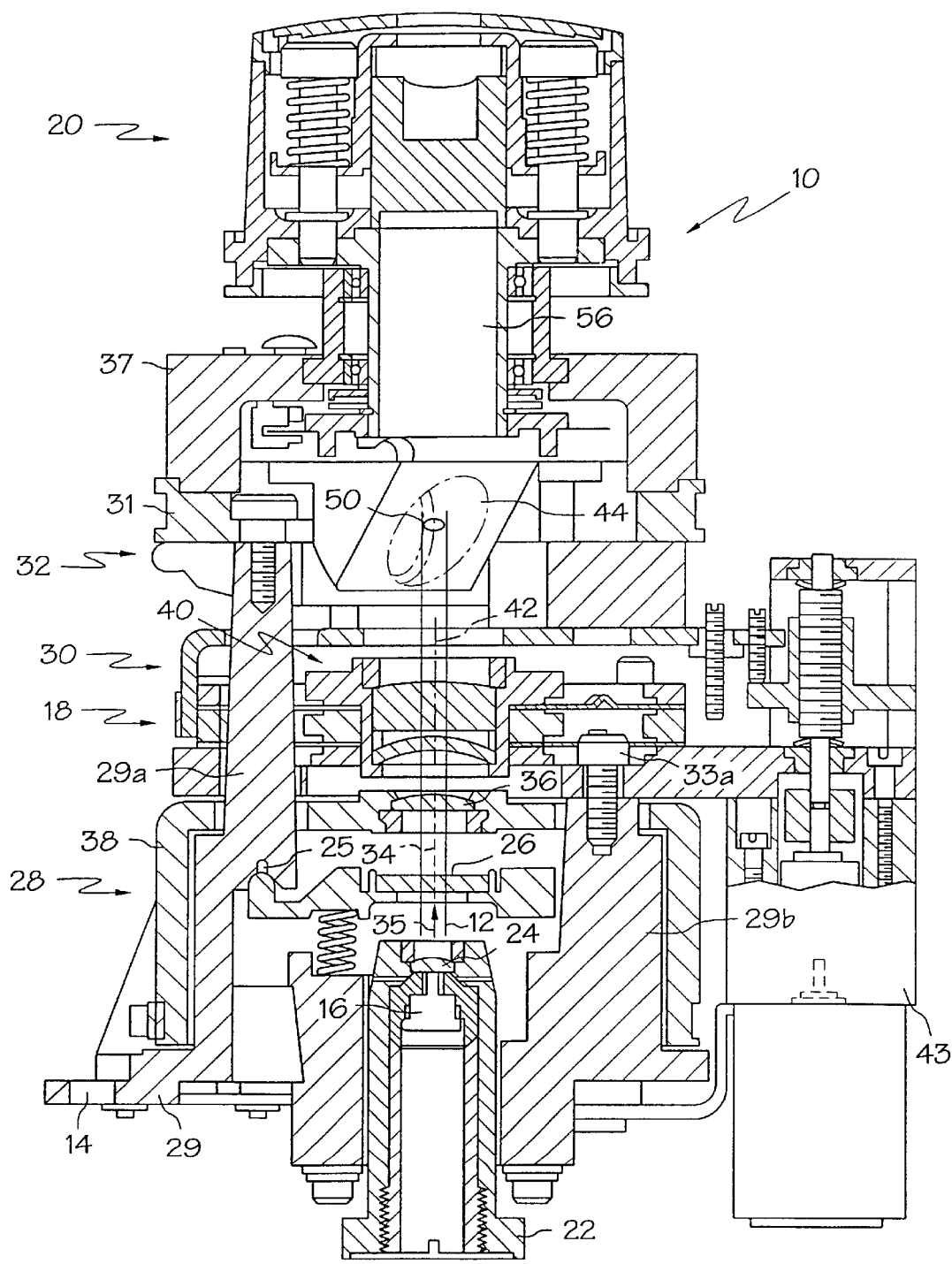
FIGS. 1 and 2 are cross-sectional views of certain components of a laser transmitter according to the present invention.

Referring now to FIG. 1, a laser transmitter 10 according to the present invention includes, among other things, a housing 14, a light source 16, an optical assembly 18 and an optical projecting device 20 for projecting a rotating reference beam of laser light. The light source 16 is coupled to a light source light source assembly 22. According to the illustrated embodiment, the light source 16 is a laser diode which generates a beam of laser light 12. The light source light source assembly 22 includes a collection lens 24 that is positioned above the light source 16. The collection lens 24 serves to collect the laser beam 12 and project it in a first direction 35. Preferably, the collection lens 24 is a planar convex lens that collimates the laser beam 12. For the purposes of defining and describing the present invention, it is noted that the housing 14 includes a plurality of components that are mechanically coupled to one another and generally define the outer shell of the laser transmitter.

The optical assembly 18 includes a flat window 26, a compensator assembly 28, and a focusing mechanism 30. The compensator assembly 28 includes, among other things, an optics frame 29, a compensator cup 38, and a wire clamp ring 31. The optics frame 29 typically defines part of the housing 14, or is at least coupled to and supported by the housing 14. The light source assembly 22 is coupled to the optics frame 29. The flat window 26 is positioned above the collection lens 24 and is pivotally coupled to the optics frame 29 through a spherical pivot 25 so as to be tiltable along an X-axis and a Y-axis, typically under the control of two calibration screws (not shown). The position of the flat window 26 is finely adjusted by the calibration screws so that the laser beam 12 is projected along substantially vertical axis or first axis 34. The laser beam 12 will therefore be plumb when the optics frame 29 is positioned along a plane which is substantially parallel with respect to the plane of the ground, i.e. Substantially level. For the purposes of defining and describing the present invention, it is noted that a plumb beam of light is a vertical beam of light. The laser beam 12 is projected along the first axis 34 by the light source 16 and the collection lens 24 and is made plumb by the flat window 26. It should be apparent that the laser beam will be plumb as long as the optics frame 29 and housing 14 are in a substantially plumb orientation.

Figure 2:
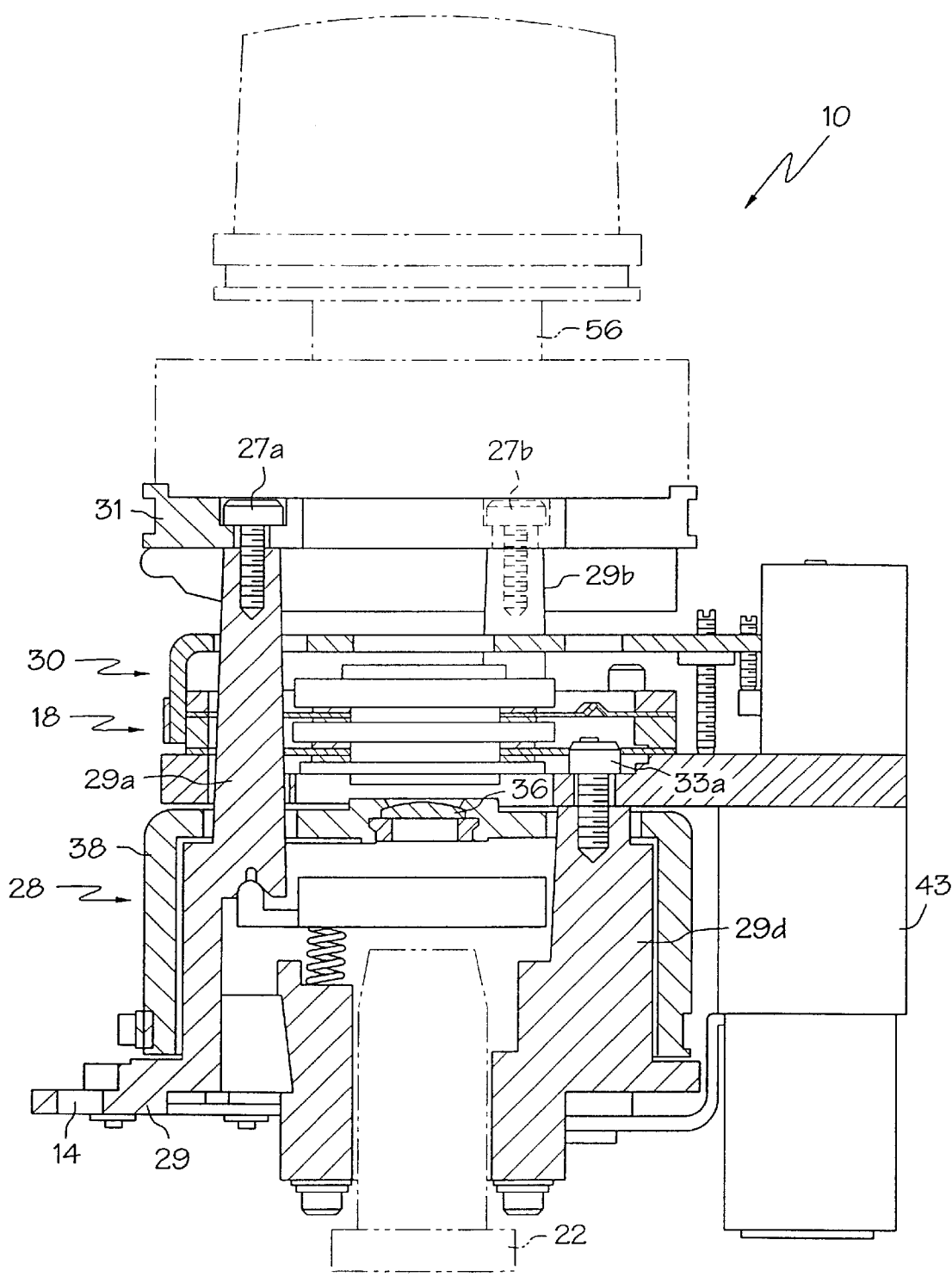
Figure 3:
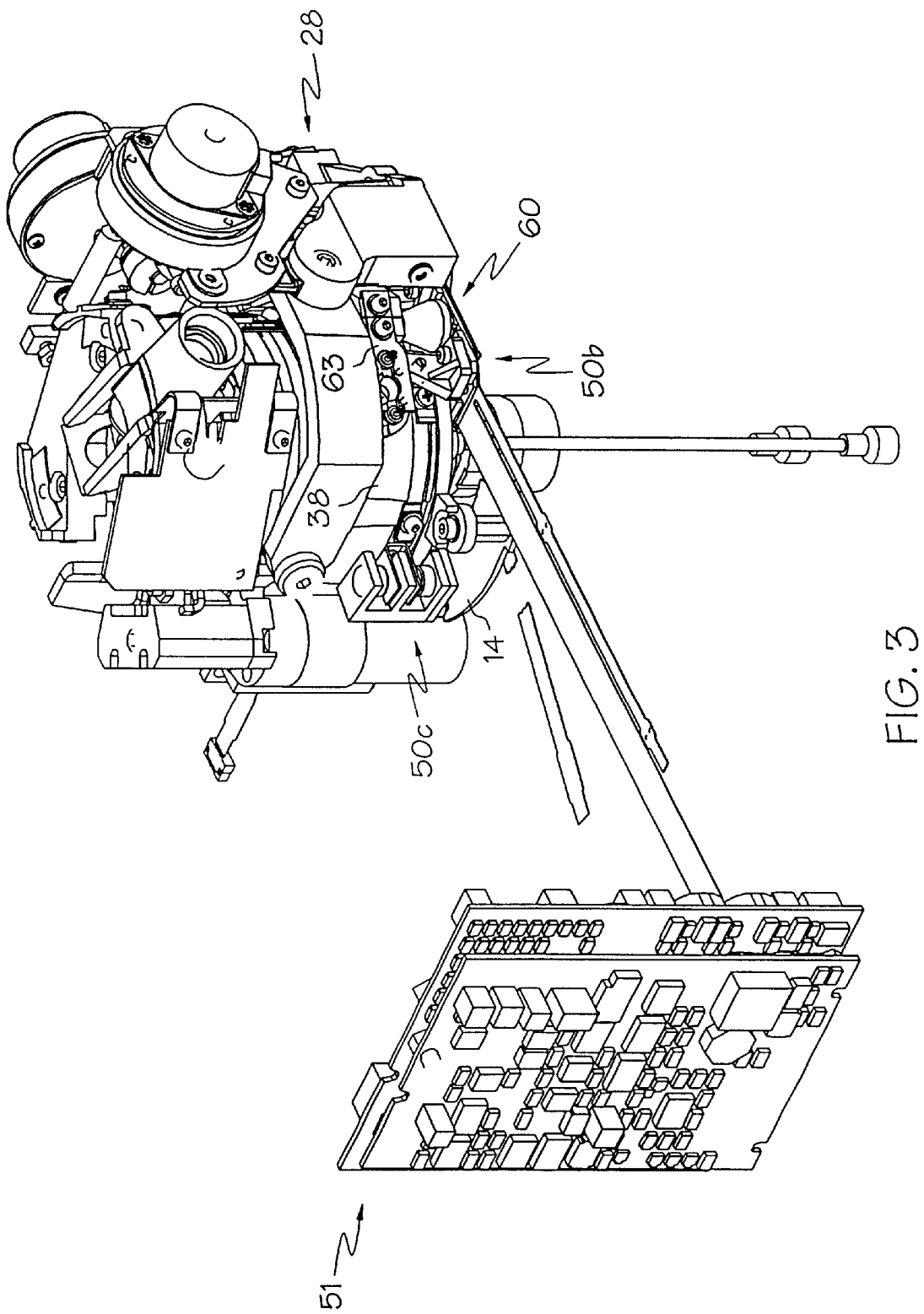
FIG. 3 is an isometric view of a compensator assembly and associated components of a laser transmitter according to the present invention.
Figure 4:
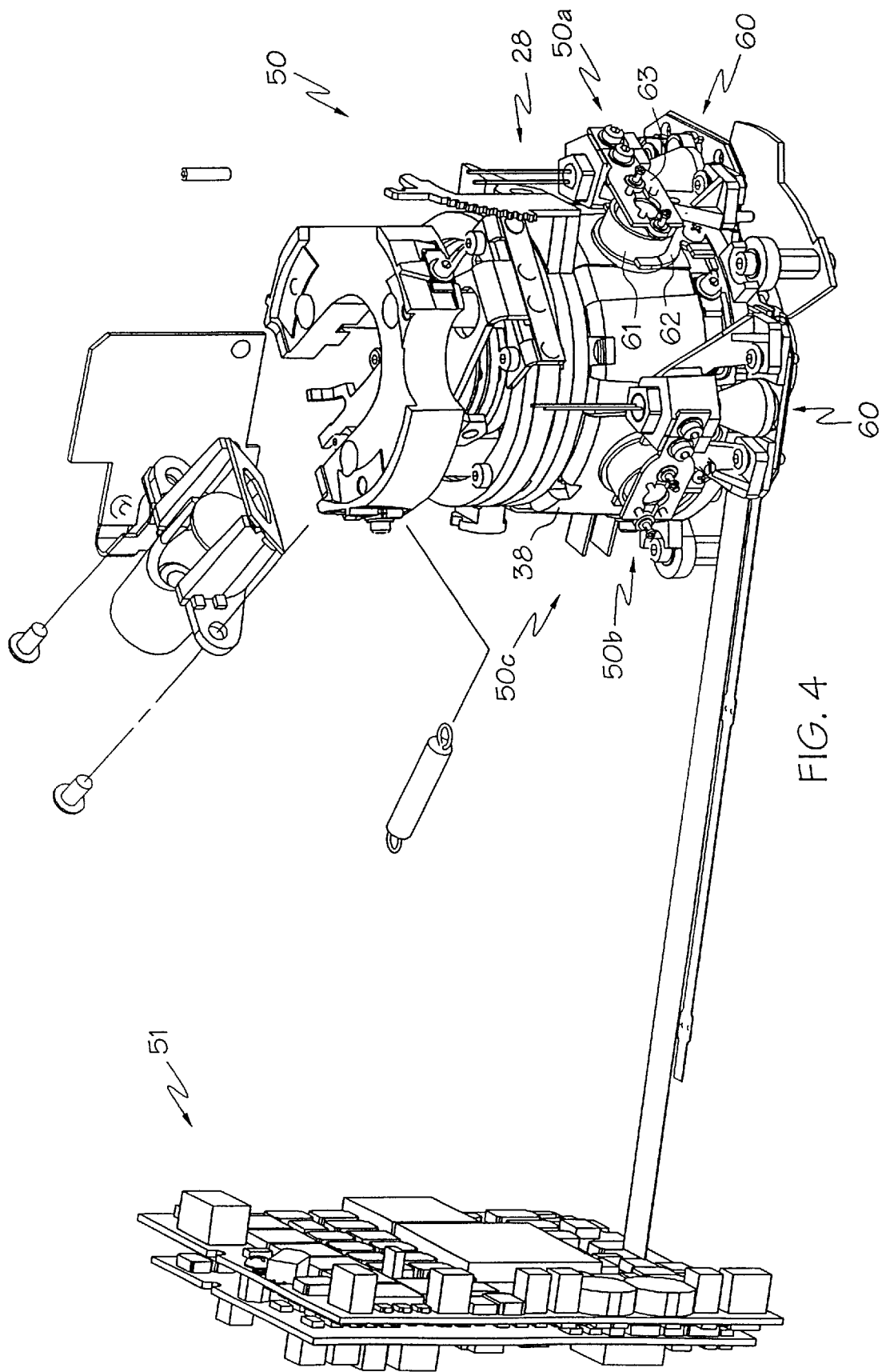
FIG. 4 is an exploded view of the compensator assembly and associated components illustrated in FIG. 3.
Figure 5:
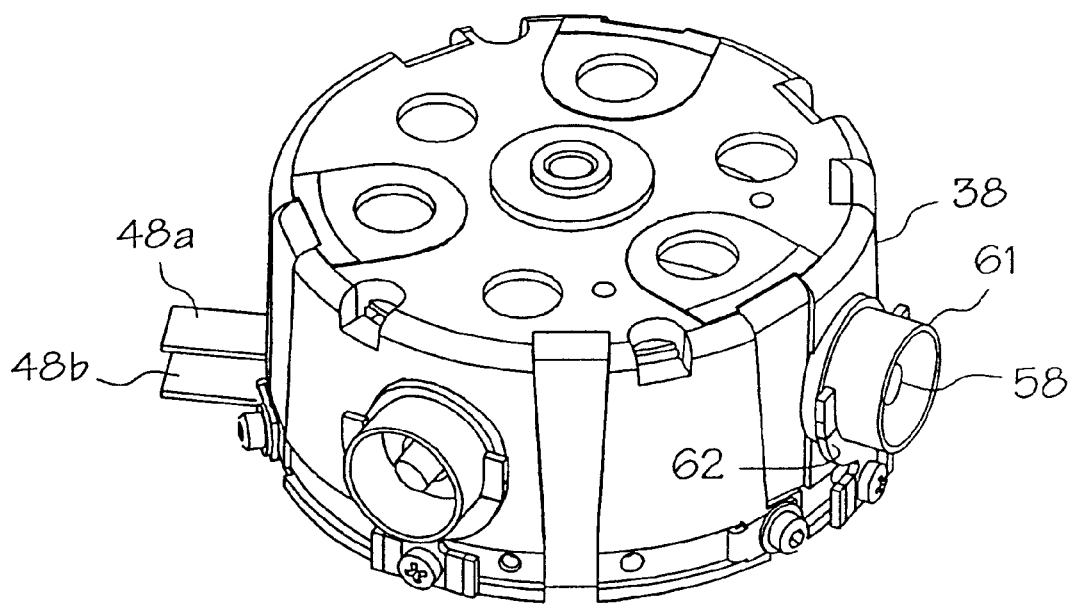
FIG. 5 is an isometric illustration of a compensator cup and selected associated components according to the present invention.
Figure 6:
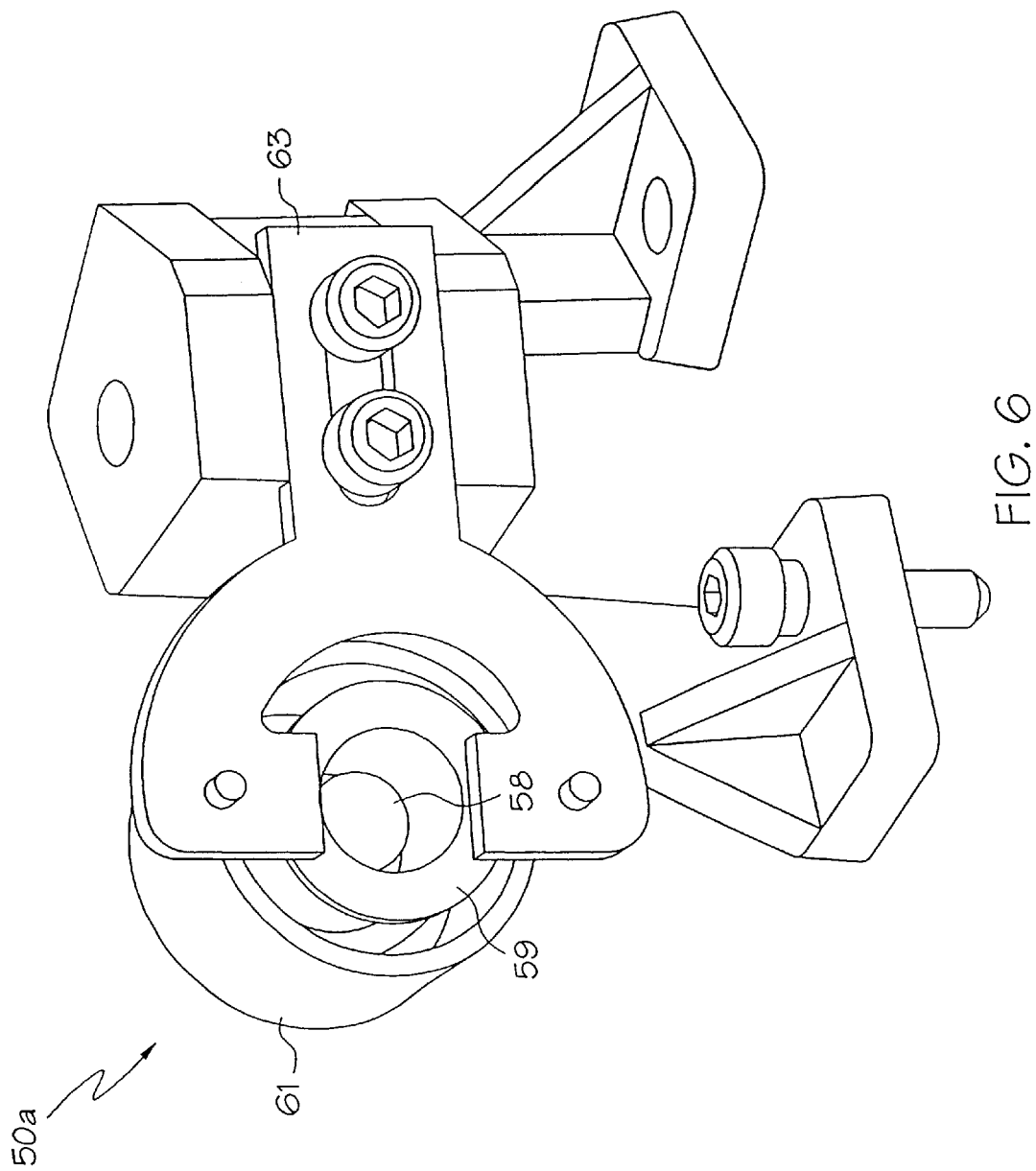
FIG. 6 is an isometric view of selected portions of a magnetic damping mechanism according to the present invention.

The focusing mechanism 30 is positioned above the compensator cup 38 and coupled to the optics frame 29 through three small posts by three fasteners (only one post 29*d* and one fastener 33*a* are visible in FIGS. 1 and 2). The three posts of the optics frame 29 pass through the focusing mechanism 30 so that the focusing mechanism 30 does not contact the compensator cup 38. The focusing mechanism 30 includes a focusing lens 40 which may be translated along the first axis 34 to adjust the focus of the laser beam 12. The focusing mechanism 30 is positioned so that the first axis 34 coincides with an optical axis 42 of the focusing lens 40. A plumb beam of laser light 12 is focused by the focusing mechanism 30 along the optical axis 42. The focusing mechanism 30 includes a focus motor 43 coupled to the focusing lens 40. The focus motor 43 is adapted to change the position of the focusing lens 40, thereby adjusting the focus of the laser beam 12. A description of the focusing mechanism 30 is presented in U.S. Pat. No. 5,805,362, issued to Hayes on Sep. 8, 1998, the disclosure of which is incorporated by reference. It will be appreciated by those skilled in the art that another focusing mechanism may be used without departing from the scope of the present invention. It will be further appreciated by those skilled in the art that the present invention may be practiced with or without the focusing mechanism 30.

The wire clamp ring 31 is positioned above the focusing mechanism 30 (see also FIG. 9) and is the upper most portion of the compensator assembly 28. The wire clamp ring 31 includes the three wires (not shown) for suspending the compensator cup 38. The compensator assembly 28 is the main frame of reference for the laser transmitter 10. The optical projecting device 20 is coupled to the wire clamp ring 31 through a mounting ring 37. The optical projecting device 20 includes a motor (not shown), a pentaprism 44, and a spindle 46. The optical projecting device 20 is positioned above the focusing mechanism 30 to deflect the laser beam 12 ninety degrees with respect to vertical. The pentaprism 44 is a structure which deflects incoming light at a ninety degree angle with respect to the direction of the incoming light, within limits, regardless of its precise orientation of the pentaprism 44. Consequently, the incoming light does not have to hit the pentaprism 44 at an exact location in order to be deflected ninety degrees. The pentaprism 44 is rotated within the spindle 46 by the motor at a speed of approximately 50 rpm to define a substantially horizontal plane of light. A speed of 50 rpm is well suited for visible perception of the laser light 12 by the user. However, as will be appreciated by those skilled in the art, the pentaprism 44 may be rotated at any reasonable speed without departing from the scope of the present invention. While a pentaprism is used in the illustrated embodiment to deflect the incoming light, other light deflecting devices, such as a pentamirror, a mirror, another type of prism, a reflector, or a refractor may also be used. While the laser transmitter 10 has been described with the laser light 12 being transmitted upwards, it will be appreciated by those skilled in the art that optical components may be shifted appropriately so that the laser light 12 is transmitted downwards, with the optical projecting device 20 being the lower most component and the light source 16 and light source light source assembly 22 being the upper most components.

The compensator assembly 28 optically adjusts the position of the laser beam 12 so that it is plumb even when the optics frame 29 is not substantially plumb. Specifically, the compensator assembly 28 includes a compensating lens 36 mounted in the center of the compensator cup 38. The compensator cup 38 is positioned above the flat window 26 and swings freely on three wires (not shown) attached to the wire clamp ring 31. The wire clamp ring 31 is coupled to the optics frame 29 through three posts 29*a*, 29*b*, (third post not shown) by fasteners 27*a*, 27*b* (third fastener not shown). For the purposes of defining and describing the present invention, the wire clamp ring 31, the posts 29*a*, 29*b*, the fasteners 27*a*, 27*b*, and the three wires collectively comprise one example of a compensator assembly suspension. Accordingly, the compensator assembly suspension defines three degrees of freedom in which the compensator assembly 28 is free to move. The three degrees of freedom include movement along an X-axis orthogonal to the vertical axis 34, movement along a Y-axis orthogonal to the X-axis and the vertical axis 34, and rotation through an angle θ in a plane parallel to the X and Y axes.

The compensator cup 38 is free to translate laterally when the optics frame 29 is within a certain degree of level. For example, in the illustrated embodiment, the compensator cup 38 is free to translate laterally when the optics frame 29 is within 12 minutes of level. As long as the optics frame 29 is within 12 minutes of level, the compensating lens 36 may translate along the X and Y axes and optically adjust the position of the laser beam 12 so that it is plumb as it emerges from the compensator cup 38. Specifically, because the compensator cup 38 is suspended from the wire clamp ring 31 and is free to translate within the optics frame 29, the compensator lens 36 optically adjusts the position of the laser beam 12 so that it is plumb as it emerges from the compensator cup 38.

Figure 7:
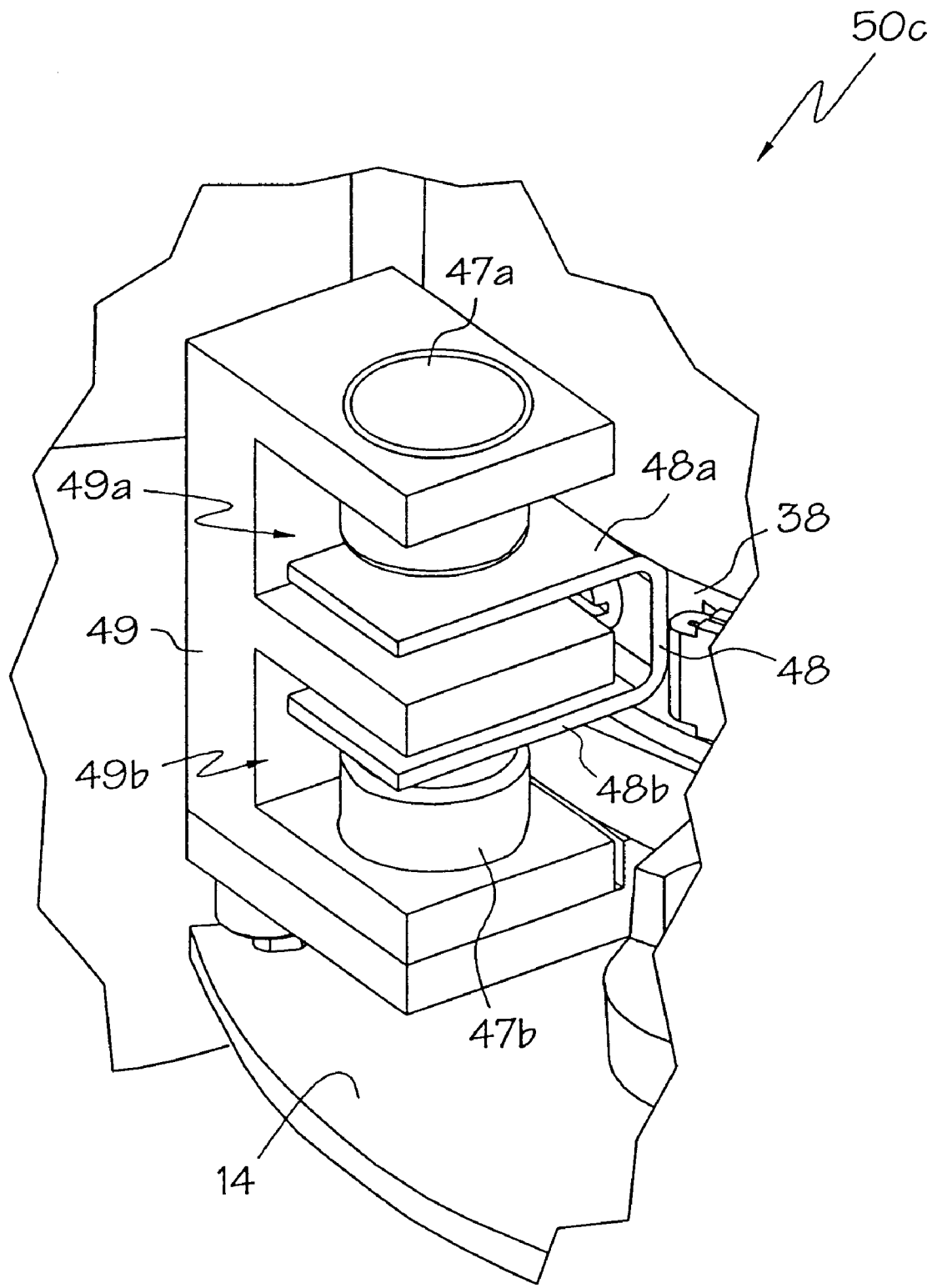
FIG. 7 is an isometric view of selected portions of a rotational damping mechanism according to the present invention.
Figure 8:
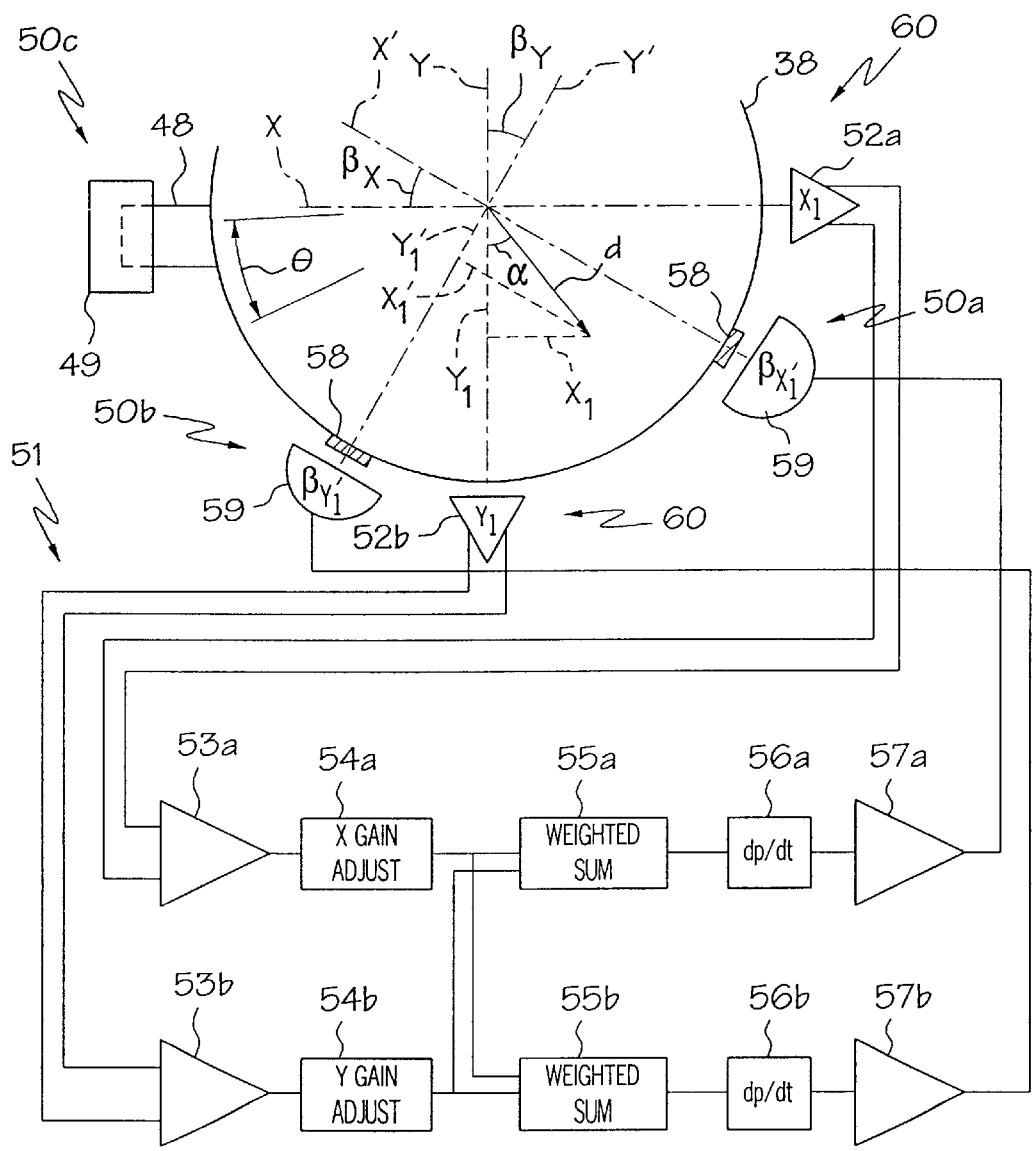
FIG. 8 is a schematic illustration of the compensator assembly and the associated active feedback circuit components according to the present invention.

Respective portions of a compensator assembly damping mechanism 50 according to the present invention are illustrated in FIGS. 3–8. The damping mechanism 50 of the present invention serves to limit undesirable oscillation and vibration of the compensator lens 36 and compensator cup 38. As is noted above, the compensator assembly suspension defines three degrees of freedom in which the compensator assembly 28 is free to move. Referring specifically to FIG. 8, the three degrees of freedom include movement along an X-axis orthogonal to the vertical axis 34, movement along a Y-axis orthogonal to the X-axis and the vertical axis 34, and rotation through an angle θ in a plane parallel to the X and Y axes. A compensator assembly position detector 60, described in detail below with reference to FIGS. 9–13, is arranged to detect a position $X_1$ of the compensator assembly 28 with respect to the X-axis and a position $y_1$, of the compensator assembly 28 with respect to the Y-axis. The positions $X_1$, and $Y_1$ change as the compensator assembly 28 moves relative to the vertical axis 34.

The compensator assembly damping mechanism 50 includes an X-axis magnetic damping mechanism 50*a*, a Y-axis magnetic damping mechanism 50*b*, and a rotational damping mechanism 50*c*. The X-axis damping mechanism 50*a* is arranged to magnetically damp movement of the compensator assembly 28 along the X-axis. The Y-axis damping mechanism 50*b* is arranged to magnetically damp movement of the compensator assembly 28 along the Y-axis. The rotational damping mechanism 50*c* is arranged to magnetically damp movement of the compensator assembly through the angle θ. An active feedback circuit 51 is provided and is arranged to drive the X-axis magnetic damping mechanism 50*a* and the Y-axis magnetic damping mechanism 50*b*.

Preferably, the X-axis magnetic damping mechanism 50a and the Y-axis magnetic damping mechanism 50b are controlled as a function of the rate at which the compensator assembly 28 is moving along the X and Y axes. Specifically, the active feedback circuit 51 is arranged to drive the X-axis magnetic damping mechanism 50a so as to increase a damping force generated by the X-axis magnetic damping mechanism 50a as the rate of change of the signal indicative of the position x, increases. Similarly, the active feedback circuit 51 is arranged to drive the Y-axis magnetic damping mechanism 50a so as to increase a damping force generated by the Y-axis magnetic damping mechanism 50a as the rate of change of the signal indicative of the position $Y_1$ increases.

The active feedback circuit 51 includes an X-axis position sensor 52a and a Y-axis position sensor 52b. An illustrative example of a respective position sensors suitable for use in the present invention is presented herein with reference to FIGS. 9–13, where a compensator assembly position detector 60 is described. Referring again to the active feedback circuit 51 of FIG. 8, a pair of differential amplifiers 53a, 53b are provided to receive signals from the X and Y axis position sensors 52a, 52b. In addition, respective X and Y gain adjustment components 54a, 54b and weighted summing components 55a, 55b are provided to enable tuning of the feedback circuit 51. Respective differentiators 56a, 56b and coil drive amplifiers 57a, 57b are coupled to the respective outputs of the weighted summing components 55a, 55b. In this manner, the active feedback circuit increases the respective damping forces generated by the X and Y-axis magnetic damping mechanisms 50a, 50b by driving the damping mechanisms 50a, 50b as a function of a time derivative of the corresponding position signal $X_1$, $Y_1$.

The weighted summing components 55a, 55b are provided because mechanical design constraints typically result in a device configuration where the X and Y axis magnetic damping mechanisms 50a, 50b are offset from the X and Y axes by a predetermined angle. Specifically, referring to FIG. 8, in the illustrated embodiment, the X-axis magnetic damping mechanism 50a is displaced from the X-axis by a first displacement angle $\beta_x$ along an arc about the central vertical axis 34 of the compensator assembly 28. Similarly, the Y-axis magnetic damping mechanism 50b is displaced from the Y-axis by a second displacement angle $\beta_y$ along an arc about the central vertical axis 34. As a result, the forces generated by the respective X and Y axis magnetic damping mechanisms 50a, 50b are directed along offset axes X' and Y'.

Accordingly, as will be appreciated from the geometries associated with the arrangement illustrated in FIG. 8, given a compensator cup displacement d having components $x_1$, $y_1$, it becomes necessary to generate a damping force defined by components $X_1'$, $Y_1'$ as opposed to $X_1$, $y_1$. The appropriate conversion from the $x_1$, $y_1$ frame of reference to the $X_1'$, $Y_1'$ frame of reference for the displacement d of the compensator cup 38 may be accomplished by providing the summing components 55a, 55b. The weighted summing components 55a, 55b are arranged to compensate for the first displacement angle $\beta_x$ and the second displacement angle $\beta_y$ by executing respective weighted sums of the signals indicative of the position $X_1$ and the position $y_1$. To simplify circuitry design, it is preferable to arrange the X and Y axis magnetic damping mechanisms 50a, 50b such that the first displacement angle $\beta_x$ and the second displacement angle $\beta_y$ are substantially equal. As will be appreciated by those practicing the present invention, the above-described conversion may also be accomplished with the aid of a suitably programmed digital processor where $X_1$, $Y_1$ are measured by the position sensors 52a, 52b, α is determined from $X_1$ and $Y_1$, and $\beta_x$ and $\beta_y$ are known.

Referring now additionally to FIGS. 3–6, the structure of the X and Y-axis magnetic damping mechanisms 50a, 50b is described with reference to the X-axis magnetic damping mechanism 50a only because the structure of the Y-axis magnetic damping mechanism 50b is substantially identical to that of the X-axis magnetic damping mechanism 50a. The X-axis magnetic damping mechanism 50a includes a first permanent magnet 58 and a first coil assembly 59. The permanent magnet 58 is mechanically coupled to the compensator cup 38 of the compensator assembly 28 with the aid of a magnet holder 61 and clamp 62. The coil assembly 59 is positioned proximate the first permanent magnet 58 and is mechanically coupled to the housing 14 with a coil bracket 63. Referring specifically to the schematic representation of the present invention of FIG. 8, the first permanent magnet and the second permanent magnet are separated by an arc of about 90° about the central vertical axis 34 of the compensator assembly 28. Each of the permanent magnets 58 are arranged concentrically in relation to the corresponding coil assembly 59 about a radial projection from the central vertical axis 34.

The rotational damping mechanism 50c comprises an eddy current damping mechanism operating according to well known eddy current damping principles. Referring specifically to FIG. 7, the rotational damping mechanism 50c includes a conductor 48 mechanically coupled to and projecting from the compensator cup 38 and a magnetic field source 49 mechanically coupled to the housing 14. As is illustrated in FIG. 7, the conductor 48 preferably comprises a pair of substantially parallel copper fins 48a, 48b and the magnetic field source 49 preferably comprises a pair of magnets 47a, 47b mounted to a bracket constructed of ferrous material. The magnetic field source 49 and the conductor 48 are arranged such that the conductor 48 intersects a magnetic field generated by the magnetic field source 49 and such that the conductor 48 is oriented substantially perpendicular to the magnetic field generated by the magnetic field source 49. The magnetic field source 49 defines a pair of field zones 49a, 49b arranged along a common field axis. The magnetic field source 49 and the conductor 48 are arranged such that each of the fins 48a, 48b intersects one of the pair of field zones 49a, 49b.

As will be appreciated from the additional description of the compensator assembly position detector 60 of FIGS. 9–13, the beam of laser light generated by the laser light source 16 comprises a primary beam of laser light generated substantially along the first axis 34. The compensator assembly position detector 60 comprises a photodetector 68 and a position detector light source 64 operative to generate a secondary beam of light 70 along a second axis offset from the first axis. The position detector light source 64 is independent of the laser light source 16. The compensator assembly position detector 60 is arranged to detect the position $x_1$ and the position $y_1$ as a function of a position of the secondary beam of light 70 on the photodetector 68.

Referring now to FIGS. 9–13, the manner in which the position of the compensator assembly 38 along the X and Y axes is determined will be described. Specifically, referring initially to FIG. 9, a compensator assembly position detector 60 is used to detect the position of the compensator assembly 28 with respect to an X-axis and a Y-axis oriented in a horizontal plane. The signals representing the position of the compensator assembly 28 may be used to provide a means for maintaining the compensator cup 38 within a certain degree of level. As is noted above, the incident laser light 12 will be plumb as long as the compensator cup 38 is within a certain degree of level.

The compensator assembly position detector 60 includes a position detector light source 64, a first optical element 66, and a first photodetector 68. The position detector light source 64 and the first photodetector 68 are coupled to the optics frame 29 and remain fixed, while the first optical element 66 is coupled to the compensator cup 38 and moves with the compensator cup 38 relative to the optics frame 29. The movement of the first optical element 66 and the compensator cup 38 may be defined by components of movement $X_1$, $Y_1$ in the X and Y axes.

Figure 9:
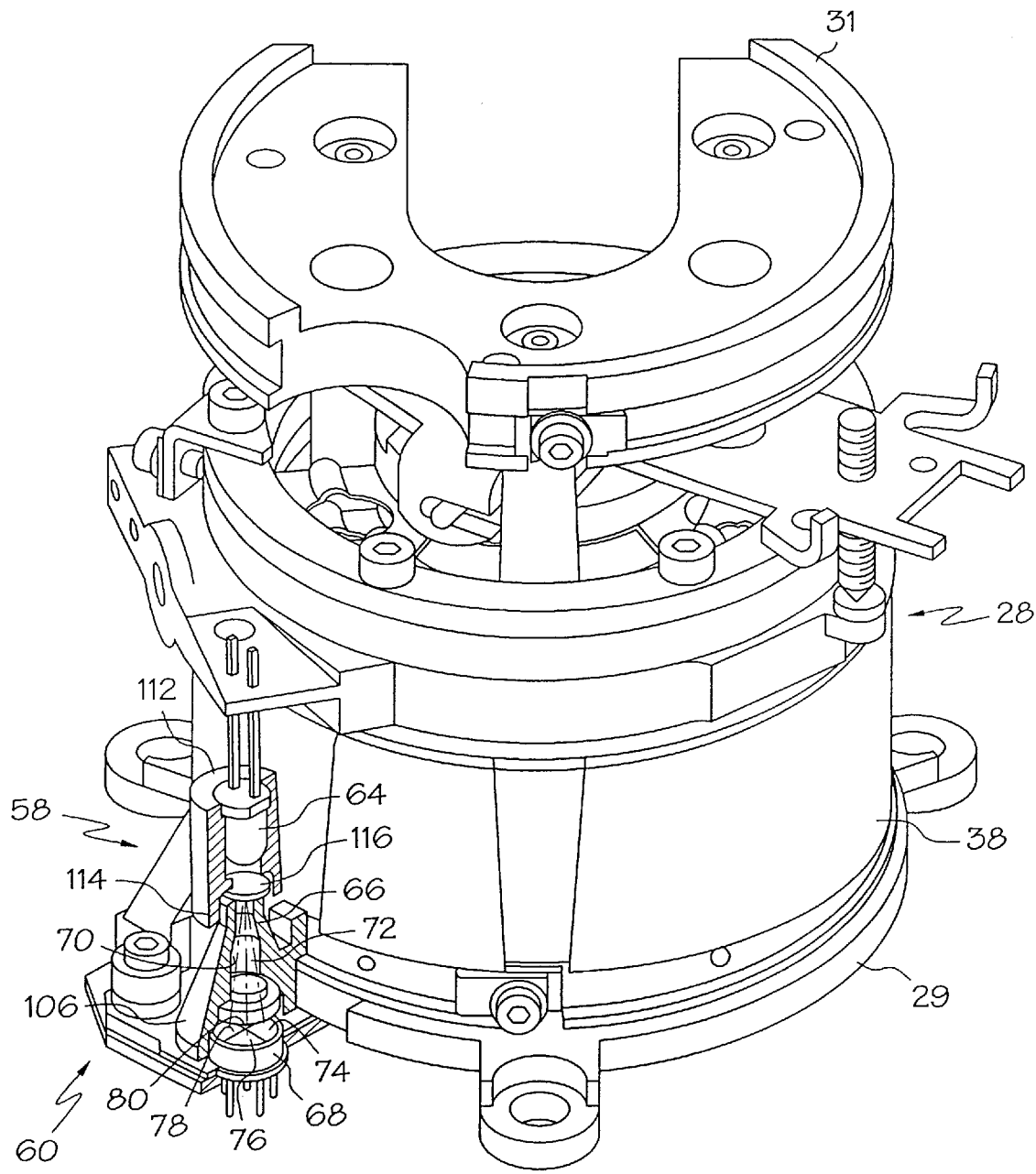
FIG. 9 is an isometric view of a compensator assembly position detector according to one embodiment of the present invention.

As shown in FIG. 9, the position detector light source 64 projects a secondary beam of light 70 along a first optical axis 72. The first optical element 66 and the first photodetector 68 are positioned such that the first photodetector 68 receives the secondary beam of light 70 which is passed through the first optical element 66. As shown in the illustrated embodiment, the first optical element 66 and the first photodetector 68 are generally aligned along the first optical axis 72. It will be appreciated by those skilled in the art that the first optical element 66 and the first photodetector 68 may be aligned along different axes without departing from the scope of the present invention. The exact alignment of the position detector light source 64, the first optical element 66, and the first photodetector 68 is dependent, in part, on the configuration of the first optical element 66 as described herein.

Figure 10:
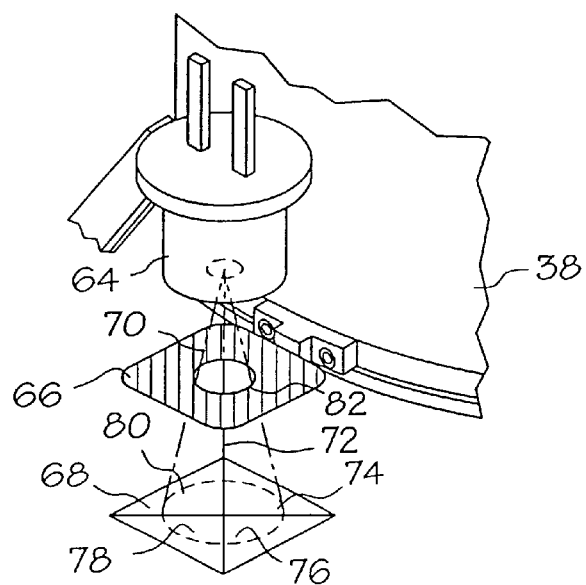
FIG. 10 is a further illustration of the compensator assembly position detector of FIG. 9.

According to a first embodiment of the present invention, the first photodetector 68 comprises a quadrant photodetector. As shown in FIG. 10, the quadrant photodetector 68 has a first detecting area 74, a second detecting area 76, a third detecting area 78, and a fourth detecting area 80. Assuming that the first optical element 66 is an opaque plate having an aperture 82 (i.e. pinhole aperture plate), and that the first optical element 66 and the first photodetector 68 are aligned with the first optical axis 72, each detecting area 74, 76, 78, 80 will receive an equal amount of light. Since the first optical element 66 moves relative to the position detector light source 64 and the first photodetector 68, the amount of secondary beam of light 70 projected onto respective detecting areas 74, 76, 78, 80 is directly proportional to the position of the first optical element 66, and hence the compensator cup 38. The position of the compensator cup 38 with respect to the X-axis may be determined by evaluating the relative amplitudes of the signals generated by the first detecting area 74 and the third detecting area 78. Similarly, the position of the compensator cup 38 with respect to the Y-axis may be determined by evaluating the relative amplitudes of the signals generated by the second detecting area 76 and the fourth detecting area 80.

Figure 11:
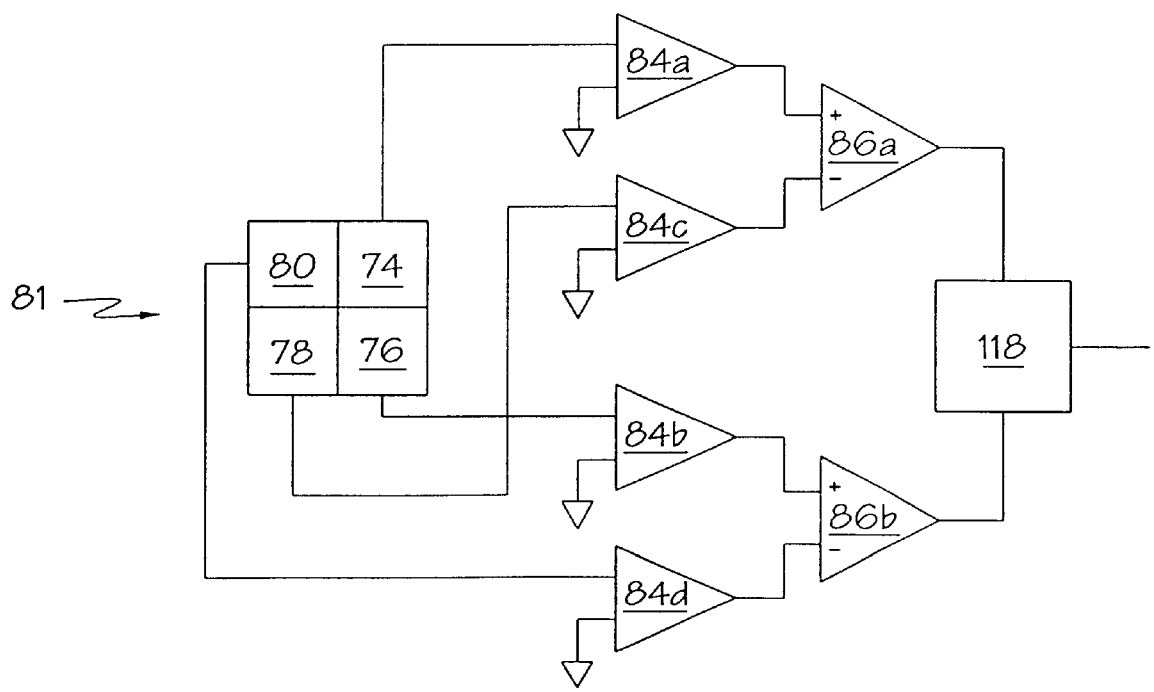
FIG. 11 is a schematic diagram of a detection circuit for a compensator assembly position detector according to the present invention.

A detection circuit 81 for evaluating the relative amplitudes of the signals is shown in FIG. 11. Each detecting area 74, 76, 78, 80 generates a photo current proportional to the intensity of the light illuminating the area. The photo currents are converted to voltages through transimpedance amplifiers 84a, 84b, 84c, 84d. The voltage output from each respective transimpedance amplifier 84a, 84b, 84c, 84d is directly proportional to the amount of light illuminating the respective detecting area. The voltages from the first transimpedance amplifier 84a and the third transimpedance amplifier 84c are input into a first differential amplifier 86a while the voltages from the second transimpedance amplifier 84b and the fourth transimpedance amplifier 84d are input into a second differential amplifier 86b. The differential amplifiers 86a, 86b output a voltage which is proportional to the difference of the input signals. The output voltage of the differential amplifier 86a indicates the relative position of the centroid of illumination along the X-axis, and hence, the relative position of the compensator cup 38 along the X-axis. Similarly, the output voltage of the differential amplifier 86b indicates the relative position of the centroid of illumination along the Y-axis, and hence, the relative position of the compensator cup 38 along the Y-axis. It will be appreciated by those skilled in the art that the relative position of the compensator 38 along the X and Y axes may be determined by taking a ratio of the above signals. It will be further appreciated by those skill in the art that a digital processor 118 may be used to evaluate the relative amplitudes of the above signals.

Figure 12:
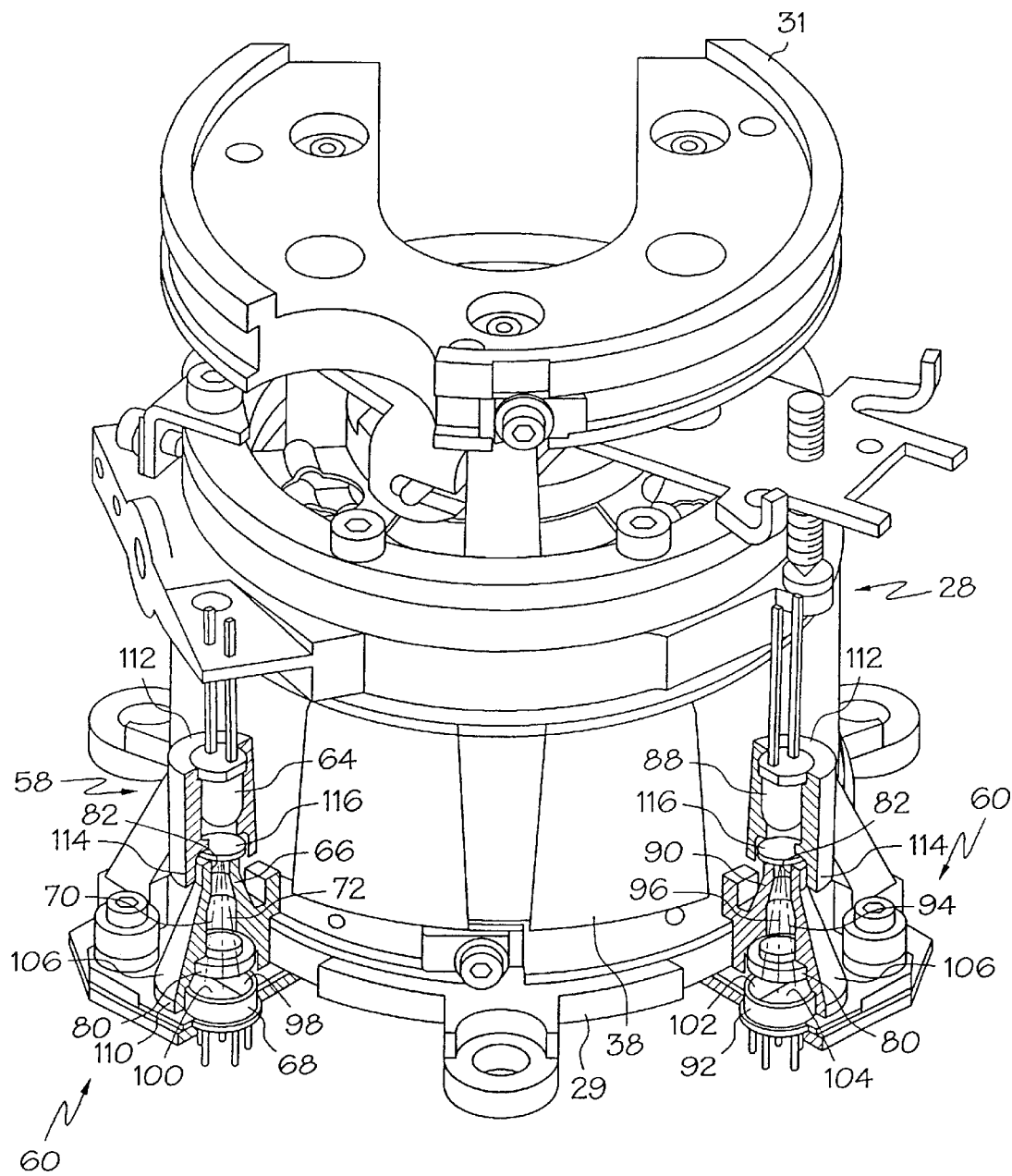
FIG. 12 is an isometric view of a compensator assembly position detector according to another embodiment of the present invention.

Referring now to FIG. 12, according to a second embodiment of the present invention, the relative position of the compensator cup 38 with respect to the X and Y axes may be determined by using a first photodetector 68' to measure movement or position relative to the X axis and another photodetector 92 to measure movement or position relative to the Y axis. The compensator assembly position detector 60 may include a second light source 88, a second optical element 90, and the second photodetector 92. The second light source 88 projects a second light 94 along a second optical axis 96. The second optical element 90 may comprise an opaque plate having an aperture 82, as described above with reference to the first optical element 66. Instead of a quadrant photodetector as in the first embodiment, the first and second photodetectors 68', 92 may include respective dual cell photodetectors. According to the illustrated embodiment, the position detector light source 64, the first optical element 66 and the first photodetector 68 are positioned to determine the position of the compensator cup 38 with respect to the X-axis while the second light source 88, the second optical element 90 and the second photodetector 92 are positioned to determine the position of the compensator cup 38 with respect to the Y-axis. The first photodetector 68 is separated from the second photodetector 92 by an arc of approximately ninety degrees about a central vertical axis of the compensator assembly 28. As with the first embodiment, the first photodetector 68 is positioned to receive the secondary beam of light 70 passed through the first optical element 66. Similarly, the second photodetector 92 is positioned to receive the second light 94 passed through the second optical element 90.

Figure 13:
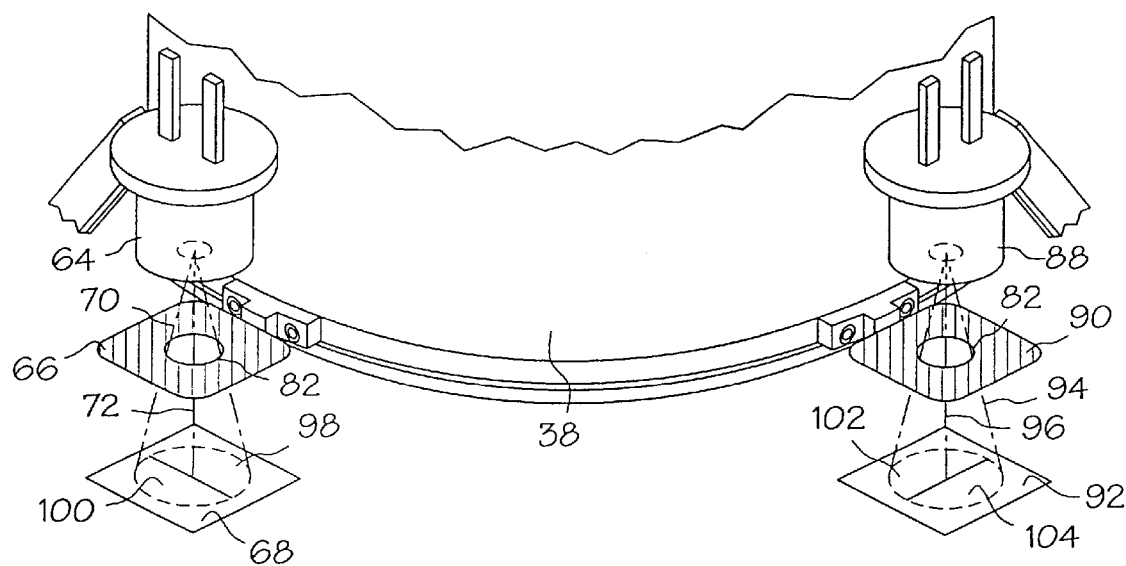
FIG. 13 is a further illustration of the compensator assembly position detector of FIG. 12.

The first and second photodetectors 68, 92 perform the same function as the quadrant photodetector of the first embodiment except each photodetector 68, 92 generates a signal with respect to a single axis only. As shown in FIG. 13, the first photodetector 68 includes a first detecting area 98 and a second detecting area 100. The second photodetector 92 includes a third detecting area 102 and a fourth detecting area 104. Each detecting area 98, 100, 102, 104 is basically a distinct photodetector which generates a signal proportional to the amount of light projected onto the detecting area. The first and second detecting areas 98, 100 are positioned along the X-axis, such that the intensity of the secondary beam of light 70 projected onto each respective detecting area 98, 100 is directly proportional to the position of the compensator cup 38 along the X-axis. Similarly, the third and fourth detecting areas 102, 104 are positioned along the Y-axis, such that the intensity of the second light 94 projected onto each respective detecting area 102, 104 is directly proportional to the position of the compensator cup 38 along the Y-axis. The position of the compensator cup 38 with respect to the X-axis may be determined by evaluating the relative amplitudes of the signals generated by the first detecting area 98 and the second detecting area 100. Similarly, the position of the compensator cup 38 with respect to the Y-axis may be determined by evaluating the relative amplitudes of the signals generated by the third detecting area 102 and the fourth detecting area 104. A detection circuit similar to the detection circuit 81 illustrated in FIG. 11 may be provided to process the signals generated by the respective detecting areas of the photodetectors 68, 92.

The first and second optical elements 66, 90 have been described as comprising opaque plates having the aperture 82. However, as will be appreciated by those practicing the present invention, there are many different types of optical elements that may be used to accomplish the function of the opaque plates. According to the illustrated embodiment in FIGS. 9 and 12, the first and second optical elements 66, 90 include a truncated cone portion 106 having the aperture 82 positioned substantially adjacent to the respective light sources 64, 88. The truncated cone portion 106 also includes a focusing lens 108 which is positioned substantially adjacent to respective photodetectors 68, 92. The focusing lens 108 focuses the light passed through the aperture 82 so that a more precise position measurement may be made. It should be apparent that the focusing lens 108 may be discarded if the detecting areas of the photodetectors are sufficiently large. The truncated cone portion 106 also includes a shoulder portion 110 which extends over the respective photodetector 68, 92. The shoulder portion 110 helps prevent extraneous light from reaching the respective photodetector 68, 92 which could cause inaccurate position measurements.

The first and second light sources 64, 88 are enclosed in a light source housing 112. The light source housing 112 includes a shoulder portion 114 which extends over the truncated cone portion 106. The shoulder portion 114 helps prevent extraneous light from entering the truncated cone portion 106 through the aperture 82. The light sources 64, 88 may comprise light emitting diodes for generating the first and second lights 68, 94. The light sources 64, 88 may also include diffusers 116 (see FIG. 12). A substantially symmetric and uniform beam of light emerges from the diffuser 116 for more precise and accurate position measurements. It will be appreciated by those skilled in the art that other light sources may be used without departing from the scope of the present invention.

Having described the invention in detail and by reference to preferred embodiments thereof, it will be apparent that modifications and variations are possible without departing from the scope of the invention defined in the appended claims. For example, the control circuitry of the present invention may incorporate thermistors to enable compensation for temperature dependent operational variations of light sources or electromagnetic coils utilized in the transmitter of the present invention.

What is claimed is:

1. A laser transmitter comprising:

a housing;

a laser light source coupled to said housing and operative to generate a beam of laser light;

an optical projecting device positioned to direct said beam of laser light to define a reference beam of light projected out of said housing;

a compensator assembly arranged to provide an optical correction for misalignment of said housing relative to a vertical axis;

a compensator assembly suspension arranged to couple said compensator assembly to said housing, wherein said suspension defines three degrees of freedom in which said compensator assembly is free to move, and wherein said three degrees of freedom include movement along an X-axis orthogonal to said vertical axis, movement along a Y-axis orthogonal to said X-axis and said vertical axis, and rotation through an angle θ in a plane parallel to said X and Y axes;

a compensator assembly position detector arranged to detect a position $X_1$ of said compensator assembly with respect to said X-axis, and a position $Y_1$ of said compensator assembly with respect to said Y-axis;

a compensator assembly damping mechanism including an X-axis magnetic damping mechanism, a Y-axis magnetic damping mechanism, and a rotational damping mechanism, wherein said rotational damping mechanism is arranged to magnetically damp movement of said compensator assembly through said angle θ; and an active feedback circuit, wherein said active feedback circuit is arranged to drive said X-axis magnetic damping mechanism so as to increase a damping force generated by said X-axis magnetic damping mechanism as a rate of change of said signal indicative of the position $x_1$ increases, and drive said Y-axis magnetic damping mechanism so as to increase a damping force generated by said Y-axis magnetic damping mechanism as a rate of change of said signal indicative of the position $Y_1$ increases.

2. A laser transmitter as claimed in claim 1 wherein said active feedback circuit is arranged to:

drive said X-axis magnetic damping mechanism as a function of a time derivative of a signal indicative of said position $x_i$; and drive said Y-axis magnetic damping mechanism as a function of a time derivative of a signal indicative of said position $y_1$.

3. A laser transmitter as claimed in claim 1 wherein:

said X-axis magnetic damping mechanism includes a first permanent magnet mechanically coupled to said compensator assembly and a first coil assembly positioned proximate said first permanent magnet and mechanically coupled to said housing; and said Y-axis magnetic damping mechanism includes a second permanent magnet mechanically coupled to said compensator assembly and a second coil assembly positioned proximate said second permanent magnet and mechanically coupled to said housing.

4. A laser transmitter as claimed in claim 3 wherein said first permanent magnet and said second permanent magnet are separated by an arc of about 90° about a central vertical axis of said compensator assembly.

5. A laser transmitter as claimed in claim 3 wherein:

said first permanent magnet and said first coil assembly are arranged concentrically about a radial projection from a central vertical axis of said compensator assembly; and said second permanent magnet and said second coil assembly are arranged concentrically about a radial projection from a central vertical axis of said compensator assembly.

6. A laser transmitter as claimed in claim 1 wherein:

said X-axis magnetic damping mechanism is displaced from said X-axis by a first displacement angle $\beta_x$ along an arc about a central vertical axis of said compensator assembly;

said Y-axis magnetic damping mechanism is displaced from said Y-axis by a second displacement angle $\beta_y$ along an arc about said central vertical axis; and said active feedback circuit is arranged to compensate for said first displacement angle $\beta_x$ and said second displacement angle $\beta_y$.

7. A laser transmitter as claimed in claim 6 wherein said active feedback circuit is arranged to compensate for said first displacement angle $\beta_x$ and said second displacement angle $\beta_y$ by executing respective weighted sums of said signals indicative of said position $x_1$ and said position $y_1$.

8. A laser transmitter as claimed in claim 1 wherein said rotational damping mechanism comprises an eddy current damping mechanism.

9. A laser transmitter as claimed in claim 1 wherein said rotational damping mechanism comprises:

a conductor mechanically coupled to and projecting from said compensator assembly; and a magnetic field source mechanically coupled to said housing, wherein said magnetic field source and said conductor are arranged such that said conductor intersects a magnetic field generated by said magnetic field source and is oriented substantially perpendicular to said magnetic field.

10. A laser transmitter as claimed in claim 9 wherein:

said conductor comprises a pair of substantially parallel fins;

said magnetic field source defines a pair of field zones; and said magnetic field source and said conductor are arranged such that each of said fins intersects one of said pair of field zones.

11. A laser transmitter as claimed in claim 10 wherein:

said beam of laser light generated by said laser light source comprises a primary beam of laser light generated along a first axis;

said compensator assembly position detector comprises a photodetector and a position detector light source operative to generate a secondary beam of light along a second axis offset from said first axis;

said position detector light source is independent of said laser light source; and said compensator assembly position detector is arranged to detect said position $x_1$ and said position $Y_1$ as a function of a position of said secondary beam of light on said photodetector.

12. A laser transmitter comprising:

a housing;

a laser light source coupled to said housing and operative to generate a beam of laser light;

an optical projecting device positioned to direct said beam of laser light to define a reference beam of light projected out of said housing;

a compensator assembly arranged to provide an optical correction for misalignment of said housing relative to a vertical axis;

a compensator assembly suspension arranged to couple said compensator assembly to said housing, wherein said suspension defines at least two degrees of freedom in which said compensator assembly is free to move, and wherein said two degrees of freedom include movement along an X-axis orthogonal to said vertical axis and movement along a Y-axis orthogonal to said X-axis and said vertical axis;

a compensator assembly position detector arranged to detect a position $X_1$ of said compensator assembly with respect to said X-axis, and a position $y_1$ of said compensator assembly with respect to said Y-axis;

a compensator assembly damping mechanism including an X-axis magnetic damping mechanism and a Y-axis magnetic damping mechanism wherein said X-axis magnetic damping mechanism includes
a first permanent magnet mechanically coupled to said compensator assembly, and
a first coil assembly positioned proximate said first permanent magnet and mechanically coupled to said housing, and said Y-axis magnetic damping mechanism includes
a second permanent magnet mechanically coupled to said compensator assembly, and
a second coil assembly positioned proximate said second permanent magnet and mechanically coupled to said housing; and an active feedback circuit, wherein said active feedback circuit is arranged to
drive said X-axis magnetic damping mechanism so as to increase a damping force generated by said X-axis magnetic damping mechanism as a rate of change of said signal indicative of the position $x_1$ increases and
drive said Y-axis magnetic damping mechanism so as to increase a damping force generated by said Y-axis magnetic damping mechanism as a rate of change of said signal indicative of the position $y_1$ increases.

13. A laser transmitter as claimed in claim 12 wherein said active feedback circuit is arranged to:

drive said X-axis magnetic damping mechanism as a function of a time derivative of a signal indicative of said position $X_1$; and drive said Y-axis magnetic damping mechanism as a function of a time derivative of a signal indicative of said position $y_1$.

14. A laser transmitter as claimed in claim 12 wherein:

said suspension defines a third degree of freedom in which said compensator assembly is free to move through an angle $\theta$ in a plane parallel to said X and Y axes; and said compensator assembly damping mechanism further includes a rotational damping mechanism arranged to magnetically damp movement of said compensator assembly through said angle $\theta$.

15. A laser transmitter as claimed in claim 12 wherein:

said beam of laser light generated by said laser light source comprises a primary beam of laser light generated along a first axis;

said compensator assembly position detector comprises a position detector light source operative to generate a secondary beam of light along a second axis offset from said first axis and a photodetector;

said position detector light source is independent of said laser light source; and said compensator assembly position detector is arranged to detect said position $x_1$ and said position $Y_1$ as a function of a position of said secondary beam of light on said photodetector.

16. A laser transmitter comprising:

a housing;

a laser light source coupled to said housing and operative to generate a beam of laser light;

an optical projecting device positioned to direct said beam of laser light to define a reference beam of light projected out of said housing;

a compensator assembly arranged to provide an optical correction for misalignment of said housing relative to a vertical axis;

a compensator assembly suspension arranged to couple said compensator assembly to said housing, wherein said suspension defines at least two degrees of freedom in which said compensator assembly is free to move, and wherein said two degrees of freedom include movement along an X-axis orthogonal to said vertical axis and movement along a Y-axis orthogonal to said X-axis and said vertical axis;

a compensator assembly position detector comprising a photodetector and a position detector light source operative to generate a secondary beam of light along a second axis offset from said first axis, wherein said position detector light source is independent of said primary laser light source, and wherein said compensator assembly position detector is arranged to detect a position $X_1$ of said compensator assembly with respect to said X-axis and a position $y_1$ of said compensator assembly with respect to said Y-axis as a function of a position of said secondary beam of light on said photodetector;

a compensator assembly damping mechanism including an X-axis magnetic damping mechanism and a Y-axis magnetic damping mechanism; and an active feedback circuit, wherein said active feedback circuit is arranged to drive said X-axis magnetic damping mechanism so as to increase a damping force generated by said X-axis magnetic damping mechanism as a rate of change of said signal indicative of the position $x_1$ increases and drive said Y-axis magnetic damping mechanism so as to increase a damping force generated by said Y-axis magnetic damping mechanism as a rate of change of said signal indicative of the position $Y_1$ increases.

17. A laser transmitter as claimed in claim 16 wherein said active feedback circuit is arranged to:

drive said X-axis magnetic damping mechanism as a function of a time derivative of a signal indicative of said position $x_1$; and drive said Y-axis magnetic damping mechanism as a function of a time derivative of a signal indicative of said position $Y_1$.

18. A laser transmitter as claimed in claim 16 wherein:

said suspension defines a third degree of freedom in which said compensator assembly is free to move through an angle in a plane parallel to said X and Y axes; and said compensator assembly damping mechanism further includes a rotational damping mechanism arranged to magnetically damp movement of said compensator assembly through said angle in said plane parallel to said X and Y axes.

19. A laser transmitter as claimed in claim 16 wherein:

said X-axis magnetic damping mechanism includes a first permanent magnet mechanically coupled to said compensator assembly and a first coil assembly positioned proximate said first permanent magnet and mechanically coupled to said housing; and said Y-axis magnetic damping mechanism includes a second permanent magnet mechanically coupled to said compensator assembly and a second coil assembly positioned proximate said second permanent magnet and mechanically coupled to said housing.

\* \* \* \* \*

UNITED STATES PATENT AND TRADEMARK OFFICE
CERTIFICATE OF CORRECTION

PATENT NO. : 6,384,913 B1
DATED : May 7, 2002
INVENTOR(S) : Douglas et al.

It is certified that error appears in the above-identified patent and that said Letters Patent is hereby corrected as shown below:

Column 12,
Line 37, reads "position $x_i$, and" should read -- position $x_1$, and --

Signed and Sealed this

Twenty-third Day of July, 2002

*Attest:*

*Attesting Officer*

JAMES E. ROGAN
*Director of the United States Patent and Trademark Office*